United States Patent [19]
Kern et al.

[11] Patent Number: 5,142,133
[45] Date of Patent: Aug. 25, 1992

[54] APPARATUS FOR THE CONTROL OF VENETIAN BLINDS INCLUDING PHOTODETECTOR MEANS FOR DETECTING THE ANGLE OF INCIDENCE OF SUN LIGHT

[76] Inventors: Michael Kern, Paradiesstrasse 19, 8771 Triefenstein-Homburg; Günter Ruckstetter, Hauptstrasse 129, 8774 Rothenfels; Ekkehard Schüll, Am Sandrain 14, 8771 Hafenlohr; Frank Zimmermann, Untere Herberstrasse 8, 8700 Würzburg, all of Fed. Rep. of Germany

[21] Appl. No.: 689,350

[22] Filed: Apr. 23, 1991

[30] Foreign Application Priority Data

Oct. 11, 1990 [DE] Fed. Rep. of Germany ....... 4032221

[51] Int. Cl.$^5$ .............................................. G01J 1/20
[52] U.S. Cl. ..................................... 250/203.4; 160/5
[58] Field of Search .............. 250/203.1, 203.3, 203.4, 250/206.1, 206.2, 231.1, 233; 356/141, 142; 160/5, 168.1; 126/419, 425

[56] References Cited

U.S. PATENT DOCUMENTS

| | | | |
|---|---|---|---|
| 3,478,219 | 11/1969 | Nutz | 250/203.4 |
| 3,646,985 | 3/1972 | Klann | 160/168.1 |
| 4,273,999 | 6/1981 | Pierpoint | 250/205 |
| 4,429,952 | 2/1984 | Dominguez | 250/203.4 |
| 4,644,990 | 2/1987 | Webb, Sr. et al. | 160/5 |
| 4,773,733 | 9/1988 | Murphy, Jr. et al. | 160/5 |
| 4,841,672 | 6/1989 | Nebhuth et al. | 250/203.4 |

FOREIGN PATENT DOCUMENTS 0199931 1/1989 European Pat. Off.
2627219 12/1976 Fed. Rep. of Germany.
3801560 8/1989 Fed. Rep. of Germany.

Primary Examiner—David C. Nelms
Assistant Examiner—John R. Lee
Attorney, Agent, or Firm—Larson & Taylor

[57] ABSTRACT

The lowering and raising of slats of a venetian blind are controlled by control signals from a photodetector circuit which is mounted adjacent to the venetian blind and which acts responsive to predetermined limit values of the background brightness being exceeded. Following lowering of the venetian blind, control of the closing or screening angle of the slats is provided by a sun-tracking photodetector affixed to a slat and operating in dependence upon the angular alignment of the slat. In order to fix the closing angle of the slats at a selected value, subsequent adjustment of the slats is controlled by the sun-tracking photodetector which can, in turn, be controlled externally by a manually operated keying mechanism. The photodetector used in measurement of background brightness comprises three aligned photodiodes which are directed skyward in three different directions and which together detect the incident light over the full range of 180° in front of the venetian blind.

7 Claims, 2 Drawing Sheets

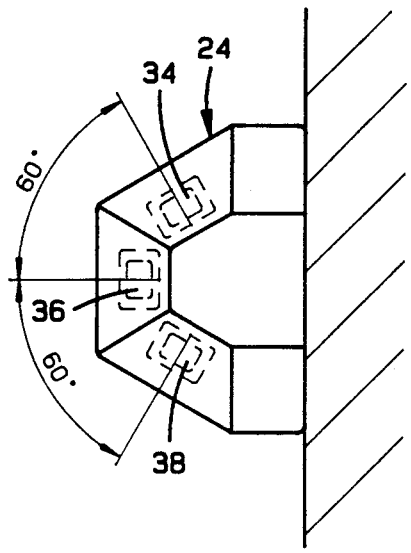
Fig. 3A
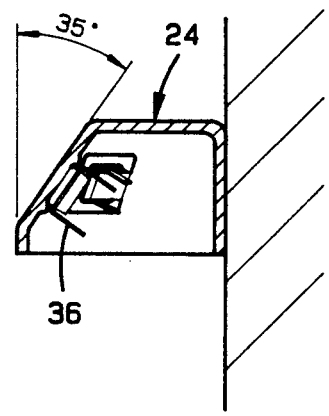
Fig. 3B
Fig. 3C
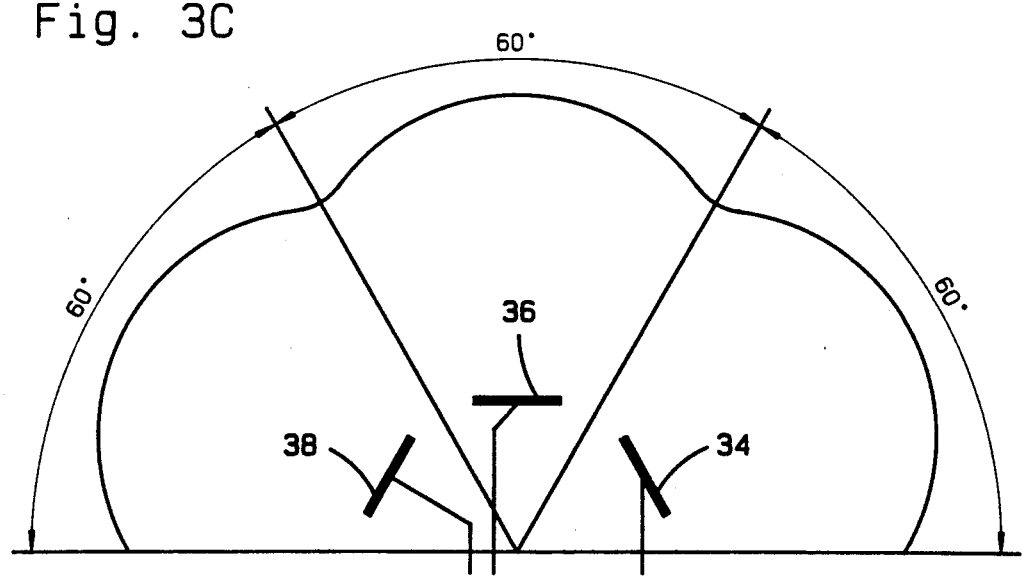

APPARATUS FOR THE CONTROL OF VENETIAN BLINDS INCLUDING PHOTODETECTOR MEANS FOR DETECTING THE ANGLE OF INCIDENCE OF SUN LIGHT

BACKGROUND OF THE INVENTION

1. Field of the Invention

The present invention relates to a method for the control of venetian blinds, and in particular, venetian blinds in buildings which have windows and are used for industrial or commercial purposes, as well as to a control device incorporating a light sensor, such as a photodetector or a light-sensitive cell, for controlling raising and lowering of such venetian blinds as well as for varying the screening angle of the slats of such venetian blinds.

2. The Prior Art

In the case of modern office buildings, providing protection from the sun's rays is important in preventing excessive heating of the work areas within the buildings, in saving energy in situations wherein air conditioning installations are employed and in providing display-quality worksites that are protected from glare. Up to now it has been customary to control the venetian blinds of the facade wall of an office building by means of sensors installed centrally on the roof of the building. Such an approach has the disadvantage that at any time according to the prevailing conditions, some windows of a facade wall are, under certain circumstances, completely protected from sunlight while other windows of the same facade wall lie in the shadow of other buildings or other parts of the same building. The problem of the different light exposure experienced by different windows of a facade wall is made even more difficult by virtue of the fact that the situation changes with the movement of the sun during the course of a day and according to the time of year. More recently, centrally controlled sun protection installations have been provided in an attempt to improve the operation of the automatic control systems for the venetian blinds. These installations use costly shading arrangement diagrams and astronomical clocks. However, such installations do not overcome the basic drawback of prior installations, viz., that the special proportions and relationships of the lighting provided at any one window are not taken in account.

One further problem of centrally controlled venetian blinds is that, following the triggering of the lowering movement of the blinds in response to sensing a preselected background brightness, the lowering command for all of the venetian blinds remains in effect only during a predetermined time period, and following this predetermined blind lowering time period, a signal is generated which provides for opening of the blinds. It will be appreciated that if blinds of different lengths (heights) are located on a building facade wall, the lowering time of the longest blind must usually be adjusted and thus the rooms with shorter lowering times, will, as a result, remain darkened for an unnecessary length of time, before the opening control pulse is generated. The opening or screening angle of the slats which is set thereafter can thus be completely incorrect depending on the time of day and time of year and the particular position of a window.

SUMMARY OF THE INVENTION

An object of the invention is therefore to provide a method and a suitable control arrangement or system for carrying out this method, whereby, particularly in buildings wherein the different window surfaces in a facade wall are exposed to different degrees of lighting, the rooms of the building are shielded or shaded from the light in as uniform a manner as possible.

To this end, according to the invention, the slats at least of one venetian blind are controlled such that the setting of the slats of the venetian blind in the screening angle providing the desired amount of opening of the blind is determined by a photodetector which detects the incident or impact angle of the rays of the sun.

A novel control method in accordance with invention is applicable to a central control system or unit which controls a constant hypothetical image of a facade wall and cooperates with a wind sensor, in a known manner, in order to provide raising of the venetian blinds when the sensor detects a wind velocity exceeding a predetermined level. The method according to the invention has no effect on this primary purpose of such a central control unit but, in an advantageous manner, supplements this purpose by providing independent regulation of the light admitting (screening) setting of the blinds. The method of the invention is applicable to venetian blinds with horizontal slats and also to venetian blinds with vertical slats (vertical blinds).

As a result of the independent control of the individual venetian blind provided, optimum control of the screening angle can be effected immediately after lowering of a blind has been accomplished, without having to take into consideration (as is the case with prior art systems) that longer blinds on the same facade wall will require a longer time to be lowered and only after these blinds are lowered are they able to be adjusted with respect to the screening angle of the slats.

It is to be understood that, according to the invention not only can the venetian blinds of a facade wall be centrally controlled in a conventional manner to move up and down, but also, in response to an excessive or limited change within certain limited values of background brightness, any individual venetian blind can be individually lowered or raised.

It is particularly important that the screening angle of the slats of the venetian blind be adapted to the changing position of the sun. In order to determine the angle of incidence or impact of the sun's rays, in accordance with a further preferred embodiment of the invention, the photodetectors of the central unit are pivoted in association with the venetian blind. Preferably, this is achieved in such a manner that when the sun is changing position the photodetectors follow the changing position of the sun. The movement of the photodetectors can thus be carried out under optimum conditions by suitable angular rotation of the slats.

In accordance with a further aspect of the invention, the control device or system for carrying out the method of the invention includes a photodetector which is affixed to a slat of the venetian blind to be controlled, and which detects a predetermined amount or degree of deviation of the angle of the incidence or impact of the incident sun's rays from the normal angle on the associated surface area. It is noted that surface area as used here is understood as the maximum projection surface of a slat.

Advantageously, the sun-tracking detector is used to determine the slightest deviations of the angle of incidence of sun's rays from the normal angle of incidence on the surface area of the slat and then to provide for modification of the screening angle in the direction in which the sun's rays continuously fall substantially vertically on the surface area of the slat. However, the invention can also be embodied such that a selected angle is continuously maintained between the incident sun's rays and the normal angle on the surface of the slat, in order to permit somewhat more light into a room than when the slats are aligned substantially vertical to the incident sun's rays. The compensating movements controlled by the control device in the latter embodiment serve to maintain the predetermined angle between the incident sun's rays and the surface area of the slat despite changing sun conditions.

In a preferred, practical embodiment, the photodetectors comprise a pair of photodiodes arranged one behind the other in horizontally aligned relation in the direction of the sun's rays with a crosspiece or upstanding member projecting outwardly between them. With this arrangement, depending on the setting of the slat and the position of the sun, a shadow is cast on one or the other photodiode when the upstanding member is not disposed so as to be directly facing the sun. Alternatively, two photodiodes are arranged in a roof-shaped or V-shaped configuration in relation to the surface area of the slat, so that the control voltages produced by the photodiodes are the same only when both photodiodes receive the sun's rays at the same angle, i.e., only when the sun shines vertically on the surface area of the slat. As a consequence, the position of the sun can be determined at any time by simply pivoting the slat, and the slats can be adjusted so as to assume optimum screening angle.

A control device according to a further important embodiment of the invention is improved by the addition of a further photodetector which is mounted adjacent to the blind and which, when a preselected background brightness is attained, produces a control pulse for controlling the operation of the venetian blind to, e.g., reduce the light level within the room in which the blind is installed by lowering the blind. The extra photodetector comprises a plurality of photodiodes (and preferably three photodiodes) which are directed skyward at different angles and which together pick up the incident light over a range of 180° in front of the venetian blind.

It is pointed out that where control devices such as those of the embodiments discussed in the previous paragraph are used, it is possible to basically manage without a central control device. The lowering and raising of the venetian blind in such an embodiment is controlled by the additional photodetector responding to the relevant background brightness, and in the lowered state of the blind the sun tracking detector, mounted on a slat, is used to control the screening angle of the slat. However, as already described, cooperation with a central control device can also be very useful in order to, to the extent possible, maintain a uniform appearance over the facade wall and to protect the venetian blinds from wind damage. With such a combined control system, the lowering and raising of all of the venetian blinds of a facade wall is first of all centrally controlled and it is only when preselected limit values of the background lighting are exceeded, or are not reached, at particular individual windows, that the additional photodetectors which are mounted there are used to provide that the relevant venetian blinds are raised or lowered in accordance with the individual circumstance or situation.

Other features and advantages of the invention will be set forth in, or will be apparent from, the detailed description of the preferred embodiment which follows.

BRIEF DESCRIPTION OF THE DRAWINGS

The invention will now be described in greater detail relative to the exemplary embodiments represented in the drawings, wherein:

FIGS. 3A, 3B and 3C are different views of a photodetector mounted adjacent to the venetian blind of FIG. 1 for the determination of background brightness.

DESCRIPTION OF THE PREFERRED EMBODIMENTS

Figure 1:
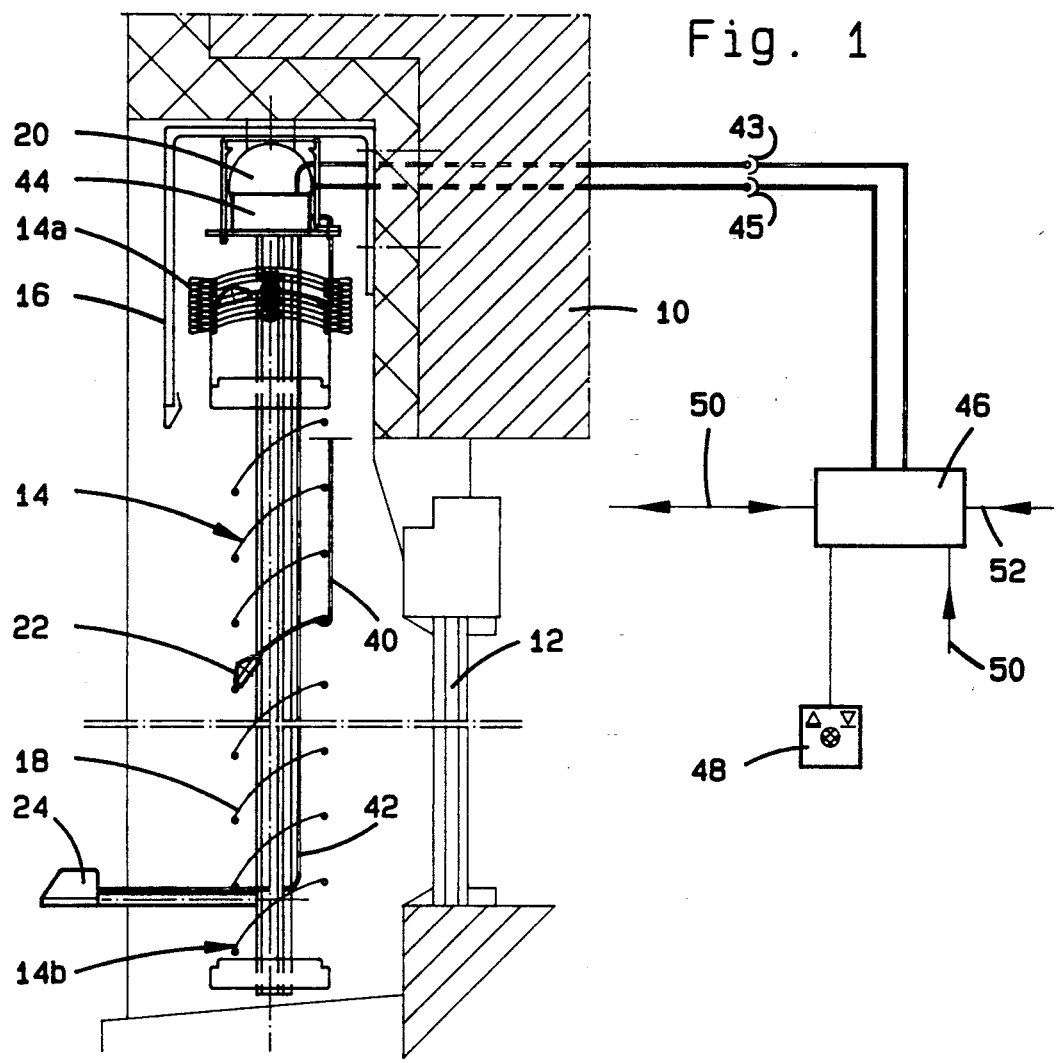
FIG. 1 is a simplified side view of a venetian blind with associated photodetectors.

Referring to FIG. 1, there is shown a section of a building wall 10 with a window 12 and a venetian blind 14 arranged outside the window 12. The venetian blind 14 is shown, for purposes of simplicity, both in the raised position thereof wherein the slats 18 of blind 14 are gathered together (at 14a) and in the lowered, light shielding or draped position (at 14b). In the raised position (14a), venetian blind 14 is received in a housing 16. The raising and lowering of venetian blind 14 as well as the rotation or turning of the slats 18 in the lowered position of blind 14 is carried out in a known manner by means of an electric motor 20 and a turning gear as is described, for example, in German Publication Opened to Public Inspection 36 25 365. It will be understood that the features of the invention described hereinafter are independent of the number, dimensions and sizes of the slats 18 as well as the manner of moving and guiding thereof. It is important only that the slats 18 in the lowered position of the blind 14 can be turned or rotated by means of controllable gearing, so that the slats 18 can be adjusted to different screening or shielding angles.

As shown in FIG. 1, a photodetector 22 is mounted on one of the slats 18, and the photodetector 22 can be fixed in position dependent upon whether the sunlight, which is incident obliquely from above, impacts vertically on the surface area of the slats or incident or the impacting rays of the sun deviate in some other direction and at some other angle through the slats which differs from the normal impact angle on the surface area of the slats. A discussion follows hereinafter with respect to the basic construction of photodetector 22, with photodetector 22 being described in greater detail relative to FIGS. 2 and 3.

Adjacent to venetian blind 14 is mounted another photodetector 24. Photodetector 24 can, for instance, be mounted in the wall adjacent to the window opening, on a guide for guiding the movement of slats 18 or in housing 16. This additional or extra photodetector 24 determines the background brightness and controls the lowering and raising of venetian blind 14. This operation is explained in greater detail relative to FIG. 4.

Figure 2:
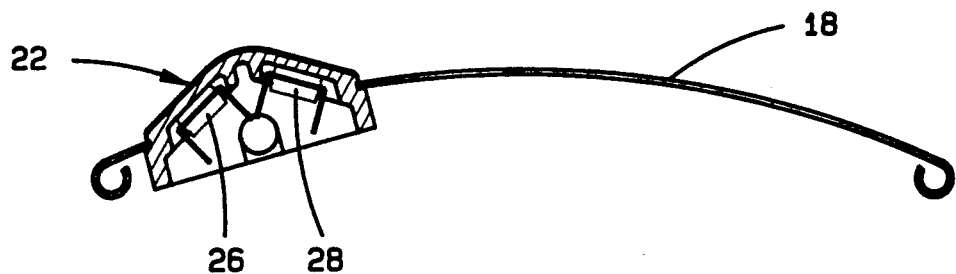
FIG. 2 is a cross section through one slat of the venetian blind of FIG. 1 with a photodetector mounted thereon.

In the embodiment of FIG. 2, photodetector 22 is inserted into a hole or perforation in a slat 18 preferably in the vicinity of the outside longitudinal edge of the slat 18. In this exemplary embodiment of FIG. 2, the photodetector 22 comprises two photodiodes 26 and 28 enclosed in transparent plastic (for instance, glass acrylate), and the photodiodes 22 are arranged at a predetermined gable angle relative to each other as in a gabled roof, i.e., are disposed in intersecting planes which form a predetermined angle therebetween. It is thus obvious that the control potential of the two photodiodes 26 and 28 is identical only when the two are subjected to sunlight of the same intensity and this is the case only when the rays of the sun are parallel to the line bisecting the gable angle of the mounting arrangement for photodiodes 26 and 28. If, on the other hand, the control potential (i.e., output voltage) of one of the two photodiodes 26 and 28 is different, e.g., lower, than that of the other one, it can be concluded that the rays of the sun are impacting or impinging at an acute angle relative to the aforementioned gable angle bisecting line. As a consequence, the photodiode 26 or 28 which produces the smaller control potential must be pivoted around in the direction of the other photodiode 28 or 26 in order to again attain a state of equilibrium in which the two photodiodes 26 and 28 are being uniformly radiated with light and, preferably, the surface areas of slats 18 which are guided parallel to them are aligned perpendicular to the impacting rays of the sun.

Referring now to FIGS. 3A and 3B, the extra photodetector 24 which is used in the determination of the background brightness comprises, as shown in plan view in FIG. 3A, three photodiodes 34, 36 and 38 arranged adjacent to one another. The photodiodes 34, 36 and 38 are each directed at an intermediate angle of 60° skyward at different angles and thus, as shown in FIG. 3B, lie at an angle of 35° oblique to the vertical. Since, as shown in FIG. 3C, each of the photodiodes 34, 36 and 38 has a receiving area of approximately 60°, the photodiodes act together to detect the background brightness over the full angular range of 180° in front of the building facade wall.

Referring again to FIG. 1, connection lines or wires 40 for photodetector 22 and connection lines or wires 42 for photodetector 24 are guided along the guide rails for the slats 18 of the venetian blind 14 to a distribution unit 44 installed either in, or on the top part of, a housing which is located at the top of blind 14 and which also houses motor 20. The distributor box 44 is connected by means of a socket coupling 43 to a motor control unit 46 which is installed in the building at a suitable site, preferably at not too great a distance from venetian blind 14. A conventional keying mechanism or keypad 48 is also connected to motor control unit 46 to enable independent operation thereof. This permits setting of the slats 18 of the venetian blind 14 manually in order, for instance, to darken one room for the purpose of showing a film. In such a case, to the motor control unit 46 is also connected an input connection 50 from a central control device (not shown). In the illustrated embodiment, a connection is provided in the form of a serial interface 50 for connection to a computer (not shown) and data storage (not shown) as well as a power supply source 52 for supplying motor 20 with 220 Volt operating voltage, and to the control device cooperating with photodetectors 22 and 24 and providing a control voltage of twenty-four volts. The motor control unit 46 is connected through a socket coupling 45 to motor 20 in order to control the motor 20 in accordance with different control inputs from motor control unit 46.

The operation of the control system described above is as follows. It is assumed that in the initial stage thereof the venetian blind 14 is raised and the slats 18 of venetian blind 14 are thus gathered together at the top of blind 14 (as indicated in FIG. 1 at 14a). When a trigger signal is transmitted, either through connection 50 from the central control device mentioned above or from photodetector 24 when the background brightness exceeds a predetermined limit for effecting lowering of the venetian blind 14. As soon as the lowered position (indicated at 14b) has been reached, the screening angle of slats 18 is then detected and adjusted by means of photodetector 22, independently of whether the other venetian blinds of the same facade wall, which are lowered simultaneously, have or have not yet reached the lowered position thereof because of their longer length. The control of the screening angle of slats 18 by means of photodetector 22 is maintained in effect continuously thereafter and acts to modify the position of the slats corresponding to the changing position of the sun. This continuous control is provided until the venetian blind 14 is raised again in response to a raising signal transmitted from the central control device or from photodetector 24.

The control device which has been described above as operating in cooperation with alignment-dependent photodetector 22 and with the other photodetector 24 used in detecting the background brightness, offers the capability that when a plurality of venetian blinds are in the lowered state (in which these blinds are normally controlled by means of the alignment-dependent photodetector 22), the blinds can be temporarily rotated to a horizontal slat setting by photodetector 24, when the blinds fall under the shadow of a cloud. With this approach, as soon as the cloud has passed and the background brightness increases once again, the alignment-dependent photodetector 2 will again take over control of the screening angle of the slats 18 and will provide for the adjustment of the slats out of a horizontal position into the optimum screening or adjustment setting corresponding to the position of the sun.

The manual setting of the angle of the slats 18 by means of keying mechanism 48 can be integrated in such a manner into the above-described control system that automatic adjustment of the screening angle by means of photodetector 22 does not occur when the blind has been manually lowered by double operation of keying mechanism 48 and the slats 18 have been brought into closed position. The automatic control mechanism would thus be initiated based on the assumption that this control is provided to produce a deliberate darkening of the room as when, for instance, a room is darkened for a slide show lecture. On the contrary, if the blind had been lowered manually by a single operation of keying mechanism 48, the slats are set at a predetermined angle of, for instance, 38° and the optimum angle is then set after being determined by the sun-finding (sun-tracking) detector 22 only when a certain brightness is exceeded. Also, when the automatic sun-finding mechanism is manually engaged in the slat setting, following such an action, the automatic sun-finding detector is disconnected. The detector then returns to operation only when a raising movement is briefly activated and then is stopped.

The control device according to the invention has been described above in connection with the control of a single venetian blind. However, it is to be understood that the invention can also be used when a plurality of windows of a facade wall are exposed at any time of year and time of day to basically the same amount or degree of light, and also when essentially the same lighting requirements apply to all of the associated rooms of the building. A single sun-finding detector 22 on one slat 18 of the venetian blinds, together with a single additional photodetector 24 disposed adjacent to one of the windows, are sufficient to control all of the venetian blinds which would then be connected essentially in parallel with one another and under the same control. In all cases, the transmission of measuring and control signals from photodetectors to motor control unit and from this unit to the motor can also be achieved without hard wired connections. Similarly a radio connection can be provided to the central control device. Communications through the sections 50 can also contain errors, and this arrangement facilitates identification and localization of such errors. Further, phototransistors can also be used in place of photodiodes.

Thus, although the invention has been described with respect to exemplary embodiments thereof, it will be understood by those skilled in the art that variations and modifications can be effected in these exemplary embodiments without departing from the scope and spirit of the invention.

What is claimed is:

1. A control device for at least one venetian blind adapted to be mounted in or on a window and comprising a plurality of slats which are moveable between a gathered state when the blind is raised and a shading state when the blind is lowered and which are rotatable, in the shading state thereof, to different angular positions corresponding to different screening angles, a motor for adjusting the angular position of said slats when in the shading state thereof so as to adjust the screening angle of the slats, and photodetector means connected to one of said slats for detecting the occurrence of a predetermined deviation in the angle of incidence of light rays of the sun on the surface area of said one slat from a normal angle of incidence and for controlling said motor to adjust the screening angle of the slats in response to detection of said predetermined deviation, said photodetector means being mounted in an opening in the slat and comprising a pair of photodiodes which are arranged in alignment one behind the other, the outside to the inside with reference to a window on which the venetian blind is mounted, said photodiodes being mounted in separate planes forming an angle therebetween and said device further comprising a further photodetector means mounted relative to said at least one venetian blind so as to produce a control signal for the motor, when a predetermined outside background brightness has been reached, for moving the venetian blind from the gathered state to the shading state.

2. A control device as claimed in claim 1 wherein the photodiodes are enclosed in a transparent plastic housing which is mounted in the opening in the slat.

3. A control device as claimed in claim 1 wherein said further photodetector means is affixed to a housing or guide part of the venetian blind.

4. A control device as claimed in claim 1 wherein the further photodetector means comprises a plurality of photodiodes which are directed skyward at different angles and which together detect the incident light over a range of 180° in front of the venetian blind.

5. A control device as claimed in claim 3 wherein said further photodetector means comprises three photodiodes.

6. A control device as claimed in claim 1 wherein connection lines for said photodetector means are mounted in or on guide rails for the slats.

7. A control device as claimed in claim 1 wherein connection lines for the first-mentioned photodetector means and the further photodetector means are mounted in or on guide rails for the slats.

* * * * *